US012711779B2

(12) United States Patent
Ra et al.

(10) Patent No.: US 12,711,779 B2
(45) **Date of Patent: *Aug. 18, 2026**

(54) APPARATUS FOR CONTROLLING VEHICLE AND METHOD THEREOF

(71) Applicants: Hyundai Motor Company, Seoul (KR); Kia Corporation, Seoul (KR)

(72) Inventors: Ju Hyeok Ra, Guri-si (KR); Yoon Suk Jang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 115 days.

This patent is subject to a terminal disclaimer.

(21) Appl. No.: 18/621,328

(22) Filed: Mar. 29, 2024

(65) Prior Publication Data

US 2025/0086981 A1 Mar. 13, 2025

(30) Foreign Application Priority Data

Sep. 11, 2023 (KR) ........................ 10-2023-0120569

(51) Int. Cl.

| | |
|---|---|
| ***G06V 20/58*** | (2022.01) |
| ***G06T 7/20*** | (2017.01) |
| ***G06T 7/62*** | (2017.01) |
| ***G06T 17/00*** | (2006.01) |
| ***G06V 10/74*** | (2022.01) |
| ***G06V 20/56*** | (2022.01) |

(52) U.S. Cl.

CPC ................ *G06V 20/58* (2022.01); *G06T 7/20* (2013.01); *G06T 7/62* (2017.01); *G06T 17/00* (2013.01); *G06V 10/761* (2022.01); *G06V 20/588* (2022.01)

(58) Field of Classification Search

CPC .. G06V 20/58; G06V 10/761; G06V 2201/07; G06V 20/56; G06T 7/20; G06T 7/62; G06T 17/00; G06T 7/246; G06T 2207/30261; B60W 40/02; B60W 60/001; B60W 2420/408; B60W 2552/50; G01S 7/4808; G01S 17/931; G01S 17/894

USPC .......................................................... 348/148

See application file for complete search history.

(56) References Cited

U.S. PATENT DOCUMENTS

| | | | | |
|---|---|---|---|---|
| 2019/0080601 | A1* | 3/2019 | Kawabe | G06V 20/58 |
| 2022/0126873 | A1* | 4/2022 | Alghanem | B60W 60/00276 |
| 2023/0266468 | A1 | 8/2023 | Jang et al. | |
| 2025/0086807 | A1* | 3/2025 | Ra | G06T 7/11 |
| 2025/0086980 | A1* | 3/2025 | Ra | G06T 17/00 |

FOREIGN PATENT DOCUMENTS

| | | | | |
|---|---|---|---|---|
| EP | 4215943 A1 * | 7/2023 | | G01S 13/931 |
| KR | 10-2023-0124252 A | 8/2023 | | |

* cited by examiner

*Primary Examiner* — Jamie J Atala
*Assistant Examiner* — Mahmoud Kamal Abouzahra
(74) *Attorney, Agent, or Firm* — Banner & Witcoff, Ltd.

(57) ABSTRACT

The disclosure presents a vehicle control apparatus comprising a sensor and a processor. The processor is configured to generate a tracking box from a virtual box acquired at an initial time point, determine associated virtual boxes at a subsequent time point, and merge virtual boxes selectively based on factors like distance, road edge location, or virtual box type, resulting in a signal indicating the merged virtual boxes.

20 Claims, 7 Drawing Sheets

VEHICLE CONTROL APPARATUS 100

PROCESSOR 110

LIDAR 120

APPARATUS FOR CONTROLLING VEHICLE AND METHOD THEREOF

CROSS-REFERENCE TO RELATED APPLICATION

This application claims the benefit of priority to Korean Patent Application No. 10-2023-0120569, filed in the Korean Intellectual Property Office on Sep. 11, 2023, the entire contents of which are incorporated herein by reference.

TECHNICAL FIELD

The present disclosure relates to a vehicle control apparatus and a method thereof, and more particularly, relates to a technology for using a sensor (e.g., a light detection and ranging (LiDAR)).

BACKGROUND

Various studies are being conducted to identify an external object by using various sensors to assist a host vehicle in driving.

In particular, while the host vehicle is driving in a driving assistance device activation mode or an autonomous driving mode, the external object may be identified by using a sensor (e.g., LiDAR).

In a process of merging virtual boxes generated by using the LiDAR, the virtual boxes may be merged incorrectly. If a merge box, which is obtained by incorrectly merging the virtual boxes, is mapped to an external object, the type, state, or size of the external object may be incorrectly identified or determined. If the type, state, or size of an external object is incorrectly identified or determined, a driving route of a host vehicle may change dramatically or incorrectly.

SUMMARY

According to the present disclosure, an apparatus for controlling a vehicle, the apparatus may comprise a sensor, and a processor, wherein the processor is configured to generate, based on obtaining a virtual box corresponding to an object at a first time point through the sensor, a tracking box by converting the virtual box to a virtual box at a second time point after the first time point, determine virtual boxes associated with the tracking box among a plurality of virtual boxes at the second time point, based on obtaining the plurality of virtual boxes at the second time point formed by a plurality of points obtained at the second time point through the sensor, and selectively merge all or part of the determined virtual boxes based on at least one of a distance between the plurality of virtual boxes at the second time point, whether the plurality of virtual boxes at the second time point are located outside a road edge, or a type of the plurality of virtual boxes at the second time point, and output a signal indicating the selectively merged virtual boxes.

The processor is configured to determine the virtual boxes associated with the tracking box among the plurality of virtual boxes at the second time point further based on the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance.

The processor is configured to determine that the object is unobstructed and determine a stationary state or a moving state of the object, based on a type of the object being determined as a first type including a pedestrian, or a third type different from a second type including a specialty vehicle, and a number of the plurality of virtual boxes at the second time point being smaller than a specified number.

The processor is configured to determine that the object is in the stationary state, determine that at least one of a width or a length of the tracking box is greater than or equal to a first reference length, determine a first straight line perpendicular to a line segment forming a first virtual box from a first center point of the first virtual box among the plurality of virtual boxes at the second time point, based on the object being in the stationary state and at least one of the width or the length of the tracking box being greater than or equal to the first reference length, and selectively skip merging at least a portion of the determined virtual boxes based on a distance between the first straight line and a second center point of a second virtual box among the plurality of virtual boxes at the second time point being greater than or equal to a second reference length.

The processor is configured to determine that a road, on which the vehicle including the apparatus is driving, is a straight line road, determine that the object is in a stationary state among a plurality of states including the stationary state and a moving state, and determine all or part of the determined virtual boxes within a first specified distance in a direction perpendicular to the front of the vehicle.

The processor is configured to determine a first region including the road and the road edge, determine a second region different from the first region including the road and the road edge, and selectively skip merging all or part of the determined virtual boxes, which are detected in the second region, from among all or part of the determined virtual boxes detected within the first specified distance.

The processor is configured to receive an entry signal indicating that a vehicle including the apparatus enters an enclosed space, determine that the object is in a stationary state among a plurality of states including the stationary state and a moving state, determine that the determined virtual boxes are located within a second specified distance, in a direction perpendicular to the object, determine that a length of each of the determined virtual boxes is greater than or equal to a reference length, and selectively skip merging all or part of the determined virtual boxes based on determining that a number of points included in the determined virtual boxes is greater than or equal to a first reference number.

The processor is configured to determine that the object is in a stationary state among a plurality of states including the stationary state and a moving state, determine that a size of the tracking box is greater than or equal to a reference size, determine that a number of points included in the tracking box is greater than or equal to a second reference number, and selectively skip merging all or part of the determined virtual boxes based on a type of the determined virtual boxes being determined as a third type that is different from a first type associated with a pedestrian and different from a second type associated with a vehicle.

The processor is configured to determine the type of the determined virtual boxes based on density of points included in the determined virtual boxes.

The processor is configured to determine that the type of the determined virtual boxes is the third type, based on the density of the points being greater than or equal to reference density.

According to the present disclosure, a method for controlling a vehicle, the method may comprise generating, by an apparatus and based on obtaining a virtual box corresponding to an object at a first time point through a sensor, a tracking box by converting the virtual box to a virtual box at a second time point after the first time point, determining virtual boxes associated with the tracking box among a plurality of virtual boxes at the second time point, based on obtaining the plurality of virtual boxes at the second time point formed by a plurality of points obtained at the second time point through the sensor, and selectively merging all or part of the determined virtual boxes based on at least one of a distance between the plurality of virtual boxes at the second time point, whether the plurality of virtual boxes at the second time point are located outside a road edge, or a type of the plurality of virtual boxes at the second time point, and outputting a signal indicating the selectively merged virtual boxes.

The method, wherein the determining the virtual boxes associated with the tracking box among the plurality of virtual boxes at the second time point is further based on the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance.

The method may further comprise determining that the object is unobstructed and determining a stationary state or a moving state of the object, based on a type of the object being determined as a first type including a pedestrian, or a third type different from a second type including a specialty vehicle, and a number of the plurality of virtual boxes at the second time point being smaller than a specified number.

The method may further comprise determining that the object is in the stationary state, determining that at least one of a width or a length of the tracking box is greater than or equal to a first reference length, determining a first straight line perpendicular to a line segment forming a first virtual box from a first center point of the first virtual box among the plurality of virtual boxes at the second time point, based on the object being in the stationary state and at least one of the width or the length of the tracking box being greater than or equal to the first reference length, and selectively skip merging at least a portion of the determined virtual boxes based on a distance between the first straight line and a second center point of a second virtual box among the plurality of virtual boxes at the second time point being greater than or equal to a second reference length.

The method may further comprise determining that a road, on which the vehicle including the apparatus is driving, is a straight line road, determining that the object is in a stationary state among a plurality of states including the stationary state and a moving state, and determining all or part of the determined virtual boxes within a first specified distance in a direction perpendicular to a front of the vehicle.

The method may further comprise determining a first region including the road and the road edge, determining a second region different from the first region including the road and the road edge, and selectively skip merging all or part of the determined virtual boxes, which are detected in the second region, from among all or part of the determined virtual boxes detected within the first specified distance.

The method may further comprise receiving an entry signal indicating that a vehicle enters an enclosed space, determining that the object is in a stationary state among a plurality of states including the stationary state and a moving state, determining that the determined virtual boxes are located within a second specified distance, in a direction perpendicular to the object, determining that a length of each of the determined virtual boxes is greater than or equal to a reference length, and selectively skip merging all or part of the determined virtual boxes based on determining that a number of points included in the determined virtual boxes is greater than or equal to a first reference number.

The method may further comprise determining that the object is in a stationary state among a plurality of states including the stationary state and a moving state, determining that a size of the tracking box is greater than or equal to a reference size, determining that a number of points included in the tracking box is greater than or equal to a second reference number, and selectively skip merging all or part of the determined virtual boxes based on a type of the determined virtual boxes being determined as a third type that is different from a first type associated with a pedestrian and different from a second type associated with a vehicle.

The method may further comprise determining the type of the determined virtual boxes based on density of points included in the determined virtual boxes. The method may further comprise determining that the type of the determined virtual boxes is the third type, based on the density of the points being greater than or equal to reference density.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
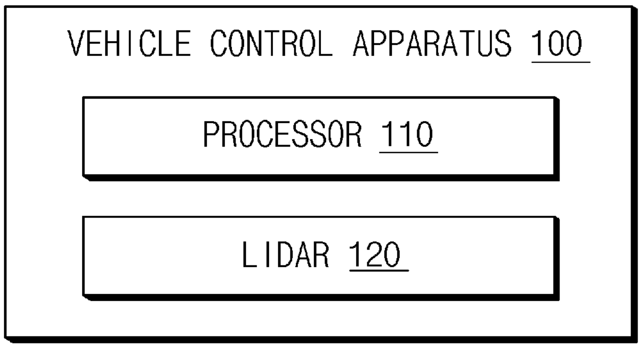
FIG. 1 shows an example of a block diagram of a vehicle control apparatus, according to an example of the present disclosure.

Hereinafter, some examples of the present disclosure will be described in detail with reference to the accompanying drawings. In adding reference numerals to components of each drawing, it should be noted that the same components have the same reference numerals, although they are indicated on another drawing. Furthermore, in describing the examples of the present disclosure, detailed descriptions associated with well-known functions or configurations will be omitted if they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various examples of the present disclosure will be described in detail with reference to FIGS. 1 to 7.

FIG. 1 shows an example of a block diagram of a vehicle control apparatus, according to an example of the present disclosure.

Referring to FIG. 1, a vehicle control apparatus 100 according to an example of the present disclosure may be implemented inside or outside a vehicle, and some of components included in the vehicle control apparatus 100 may be implemented inside or outside the vehicle. At this time, the vehicle control apparatus 100 may be integrated with internal control units of a vehicle and may be implemented with a separate device so as to be connected to control units of the vehicle by means of a separate connection means. For example, the vehicle control apparatus 100 may further include components not shown in FIG. 1.

Referring to FIG. 1, the vehicle control apparatus 100 according to an example may include a processor 110 and a sensor (e.g., LiDAR 120). The processor 110 or the sensor 120 may be electrically or operably connected to each other by an electronic component including a communication bus.

Hereinafter, the fact that pieces of hardware are coupled operably may include the fact that a direct or indirect connection between the pieces of hardware is established by wired or wirelessly such that second hardware is controlled by first hardware among the pieces of hardware. Although different blocks are shown, an example is not limited thereto.

Some of the pieces of hardware in FIG. 1 may be included in a single integrated circuit including a system on a chip (SoC). The type or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an example may include hardware for processing data based on one or more instructions. The hardware for processing data may include the processor 110.

For example, the hardware for processing data may include an arithmetic and logic unit (ALU), a floating point unit (FPU), a field programmable gate array (FPGA), a central processing unit (CPU), and/or an application processor (AP). The processor 110 may have a structure of a single-core processor, or may have a structure of a multi-core processor including a dual core, a quad core, a hexa core, or an octa core.

The LiDAR 120 included in the vehicle control apparatus 100 according to an example may obtain data sets from identifying objects surrounding the vehicle control apparatus 100. For example, the LiDAR 120 may identify at least one of a location of the surrounding object, a movement direction of the surrounding object, a speed of the surrounding object, or any combination thereof based on a pulse laser signal that is emitted from the LiDAR 120, reflected by the surrounding object, and returned.

The processor 110 included in the vehicle control apparatus 100 according to an example may obtain a virtual box of a first time point corresponding to an object, which is specified at the first time point, through the LiDAR 120. For example, the processor 110 may obtain the virtual box of the first time point by using a plurality of points, which are obtained at the first time point, through the LiDAR 120.

The processor 110 may convert the virtual box of the first time point into a virtual box of a second time point after the first time point to generate a tracking box.

For example, at least one of the first time point, the second time point, or any combination thereof may include a time point for obtaining a data set through the LiDAR 120. For example, the second time point may be referred to as a current time point (e.g., time point ‘t’). For example, the second time point may include a time point at which a current frame is obtained. For example, the first time point may include a time point immediately before the current frame is obtained. For example, the first time point may include time point ‘t−1’. It is expressed that a time point is at least one of the first time point, the second time point, or any combination thereof. However, at least one of the first time point, the second time point, or any combination thereof may mean a frame number. For example, if the second time point means a t-th frame, the first time point may mean a (t−1)-th frame.

In an example, the processor 110 may obtain a plurality of points of a second time point through the LiDAR 120. For example, the processor 110 may obtain virtual boxes of the second time point, which are formed by the plurality of points obtained at the second time point, through the LiDAR 120. For example, the virtual boxes of the second time point may be referred to as a “meta box”. For example, the virtual boxes of the second time point may include boxes formed based on points obtained as light emitted from the LiDAR 120 is reflected from an external object.

In an example, the processor 110 may identify virtual boxes associated with a tracking box among the virtual boxes of the second time point based on obtaining virtual boxes of the second time point.

For example, the processor 110 may identify a ratio at which the tracking box overlaps each of the virtual boxes of the second time point. For example, the processor 110 may identify that the tracking box overlaps each of the virtual boxes obtained at the second time point at a specified ratio (e.g., about 25%) or more.

For example, the processor 110 may identify a distance between a plurality of first points included in the tracking box and a plurality of second points included in the virtual boxes of the second time point. For example, the processor 110 may determine whether a distance between the plurality of first points included in the tracking box and the plurality of second points included in the virtual boxes of the second time point is within a correlation distance. For example, the correlation distance may be referred to as “Mahalanobis distance”.

In an example, the processor 110 may identify virtual boxes associated with the tracking box among the virtual boxes of the second time point based on the fact that the tracking box overlaps each of the virtual boxes obtained at the second time point by a specified ratio or more, or the distance between the plurality of first points included in the tracking box and the plurality of second points included in the virtual boxes of the second time point is identified as being within the correlation distance.

For example, the processor 110 may identify virtual boxes associated with the tracking box by identifying that the tracking box overlaps each of the virtual boxes obtained at the second time point by a specified ratio or more, or the distance between the plurality of first points included in the tracking box and the plurality of second points included in the virtual boxes of the second time point is within the correlation distance.

In an example, the processor 110 may or may not merge all or part of the associated virtual boxes based on at least one of a distance between virtual boxes of the second time point, whether virtual boxes of the second time point are located outside a road edge, the type of virtual boxes of the second time point, or any combination thereof. Alternatively or additionally, the processor 110 may selectively merge all or part of the associated virtual boxes based on at least one of a distance between virtual boxes of the second time point, whether virtual boxes of the second time point are located outside a road edge, the type of virtual boxes of the second time point, or any combination thereof. Hereinafter, an operation of not merging virtual boxes may include an operation of excluding all or part of virtual boxes from merge candidates.

In an example, the processor 110 may project a plurality of points obtained through a sensor (e.g., LiDAR) onto a plane formed by at least two axes among an x-axis, a y-axis, and a z-axis. The processor 110 may obtain (or generate) a virtual box based on a plurality of points projected onto a plane formed by at least two of the x-axis, the y-axis, and the z-axis.

In an example, the processor 110 may identify a virtual box on a plane formed by at least two axes among the x-axis, the y-axis, and the z-axis. Hereinafter, at least one of a virtual box, a tracking box, a merge box, or any combination thereof may include boxes generated based on a plurality of points projected onto a plane formed by the x-axis, the y-axis, and the z-axis.

In an example, on the basis of the distance between virtual boxes of the second time point, the processor 110 may or may not merge all or part of the associated virtual boxes.

For example, the processor 110 may determine whether a specified object corresponding to a tracking box is occluded. The processor 110 may identify the type of the specified object. For example, the processor 110 may identify the type of a specified object based on the tracking box associated with the specified object. For example, a tracking box may include information at a previous time point. For example, the information at the previous time point may include at least one of a heading direction of the tracking box, the type of an object corresponding to the tracking box, a speed of the object corresponding to the tracking box, a location of the object corresponding to the tracking box, or any combination thereof.

In an example, the processor 110 may identify that the specified object is not occluded.

In an example, the processor 110 may identify that the type of the specified object is of a first specified type including a pedestrian, or may identify that the type of the specified object is a different from a second specified type including a specialty vehicle. For example, the specialty vehicle may include at least one of a 1-ton truck, a truck connected to a container, a heavy truck, or any combination thereof.

In an example, the processor may determine whether the number of virtual boxes of the second time point associated with the tracking box is smaller than the specified number (e.g., 3).

In an example, the processor 110 may identify the stationary state or moving state of the specified object based on the fact that the specified object is not occluded, and the type of the specified object is identified as the first specified type including a pedestrian, or the type of the specified object is identified as being different from the second specified type including a specialty vehicle, and the number of virtual boxes of the second time point associated with a tracking box is smaller than the specified number.

In an example, the processor 110 may identify that the specified object is in the stationary state.

In an example, the processor 110 may identify at least one of a width of the tracking box, a length of the tracking box, or any combination thereof. The processor 110 may identify at least one of the width, length, or any combination thereof of the tracking box based on the coordinates of vertices included in the tracking box on the plane formed by the x-axis and the y-axis among the x-axis, the y-axis, and the z-axis.

For example, the width of the tracking box may include a length corresponding to the y-axis on the plane formed by the x-axis and the y-axis, among the x-axis, the y-axis, and the z-axis. For example, the length of the tracking box may include a length corresponding to the x-axis on the plane formed by the x-axis and the y-axis, among the x-axis, the y-axis, and the z-axis.

In an example, the processor 110 may determine whether the specified object is in a stationary state and at least one of the width or length of the tracking box is greater than or equal to a first reference length (e.g., about 30 m).

In an example, the processor 110 may determine whether the specified object is in a stationary state and at least one of the width or length of the tracking box is greater than or equal to the first reference length. The processor 110 may identify a first straight line perpendicular to a line segment forming a first virtual box from a first center point of the first virtual box among the virtual boxes of the second time point, based on the fact that the specified object is in the stationary state and at least one of the width or length of the tracking box is greater than or equal to the first reference length.

The processor 110 may determine whether a distance between a second center point of a second virtual box among the virtual boxes of the second time point and a first straight line is greater than or equal to a second reference length (e.g., about 20 m).

The processor 110 may not merge virtual boxes associated with a tracking box based on the fact that the distance between the second center point of the second virtual box among the virtual boxes of the second time point and the first straight line is greater than or equal to the second reference length.

In an example, the processor 110 may determine whether the virtual boxes of the second time point are located outside a road edge. For example, the road edge may include at least one of a guardrail, a tunnel wall, a mark for identifying a region different from a region where a vehicle is capable of driving, or any combination thereof.

In an example, the processor 110 may identify a road on which the host vehicle including the vehicle control apparatus 100 is driving. For example, the processor 110 may identify that the road on which the host vehicle is driving is a straight line road.

The processor 110 may identify that the road on which the host vehicle is driving is a straight line road and a specified object is in a stationary state among the stationary state and a moving state.

The processor 110 may identify all or part of the virtual boxes associated with the tracking box, within the first specified distance (e.g., about 50 m) in a direction (e.g., a positive x-axis) perpendicular to the front of the host vehicle. Because the reliability of virtual boxes identified in a region, in which the first specified distance is exceeded, is lower than the reliability of virtual boxes identified within the first specified distance, the processor 110 may identify all or part of the virtual boxes associated with the tracking box within the first specified distance.

The processor 110 may identify a road, on which the host vehicle is driving, and the edge of the road. For example, the processor 110 may identify a first region including the road, on which the host vehicle is driving, and the road edge.

The processor 110 may identify a second region different from the first region including the road and the road edge. For example, the second region may include a region outside the road edge.

The processor 110 may not merge all or part of associated virtual boxes, which are identified in the second region, among all or part of the associated virtual boxes identified within the first specified distance. For example, the processor 110 may not merge virtual boxes identified outside the road edge. For example, the processor 110 may exclude virtual boxes, which are identified outside the road edge, from merge candidates.

In an example, the processor 110 may receive an entry signal indicating that the host vehicle including the vehicle control apparatus 100 enters a tunnel. For example, the processor 110 may receive an entry signal indicating that the host vehicle is entering a tunnel, from at least one of a hardware component, a software component, or any combination thereof included in the host vehicle.

The processor 110 may identify that the specified object is a stationary state among the stationary state and the moving state, based on receiving the entry signal indicating that the host vehicle enters the tunnel. For example, that fact that the specified object is in the stationary state may mean that the specified object is a stationary object.

The processor 110 may determine whether virtual boxes associated with a tracking box are located within a second specified distance (e.g., 2 m) in a direction perpendicular to the specified object. For example, the processor 110 may determine whether the associated virtual boxes are located within a second specified distance from the tracking box.

The processor 110 may identify the number of points included in associated virtual boxes. For example, the processor 110 may determine whether the number of points included in the associated virtual boxes is greater than or equal to the first reference number (e.g., about 1000).

The processor 110 may not merge all or part of the associated virtual boxes based on identifying that the number of points included in the associated virtual boxes is greater than the first reference number.

According to an example, the processor 110 may merge all or part of the associated virtual boxes based on the fact that the number of points included in the associated virtual boxes is smaller than the first reference number. For example, the processor 110 may generate a merge box based on merging all or part of the associated virtual boxes. For example, the merge box may include a box corresponding to an external object at a current time point (e.g., the second time point).

The processor 110 may output the merge box based on obtaining the merge box. Hereinafter, the operation of outputting a merge box or outputting a virtual box may include an operation of mapping the merge box to an external object, or mapping the virtual box to the external object.

In an example, the processor 110 may identify that the specified object is a stationary state among the stationary state and the moving state. The processor 110 may identify the size of the tracking box based on the specified object being in the stationary state.

For example, the processor 110 may identify at least one of the width of the tracking box, the length of the tracking box, or any combination thereof. The processor 110 may identify the size of the tracking box based on the width and length of the tracking box.

The processor 110 may determine whether the size of the tracking box is greater than or equal to a reference size (e.g., about 20 $m^2$). For example, the processor 110 may identify the number of points included in the tracking box based on the size of the tracking box being greater than or equal to the reference size.

For example, the processor 110 may determine whether the number of points included in the associated virtual boxes is greater than or equal to the first reference number (e.g., about 1,000).

In an example, the processor 110 may identify the type of associated virtual boxes. For example, the processor 110 may determine whether the type of the associated virtual boxes is the third specified type including a bush object, based on the density of points included in the associated virtual boxes. For example, the bush object may include an object including an irregular shape including a bush.

The processor 110 may not merge all or part of the associated virtual boxes based on the type of the associated virtual boxes being identified as the third specified type.

In an example, the processor 110 may determine whether the density of points is greater than or equal to the reference density. The processor 110 may identify that the type of the associated virtual boxes is the third specified type, based on the density of the points being greater than or equal to the reference density.

In an example, the processor 110 may not merge all or part of the associated virtual boxes based on the fact that the specified object is in a stationary state, the size of the tracking box is greater than or equal to a reference size, the number of points included in the tracking box is greater than or equal to the second reference number, and the type of the associated virtual boxes is the third specified type.

The processor 110 may output associated virtual boxes based on not merging all or part of the associated virtual boxes. For example, the processor 110 may map each of the associated virtual boxes to an external object. For example, the processor 110 may output associated virtual boxes based on mapping each of the associated virtual boxes to an external object.

Figure 2:
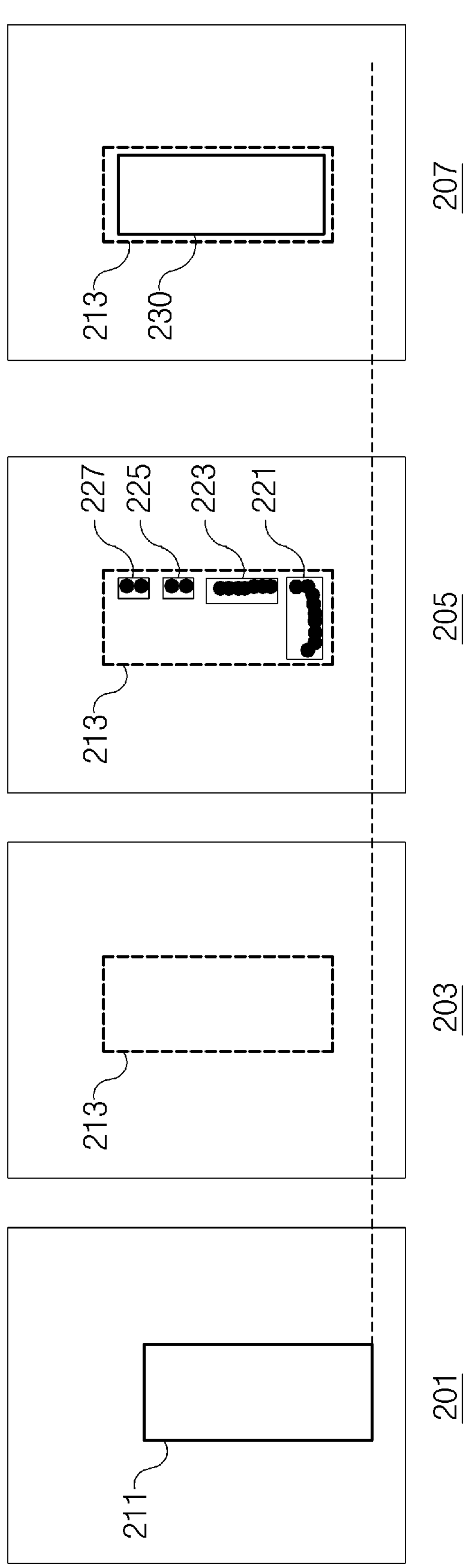
FIG. 2 shows an example of generating a merge box by using virtual boxes, in an example of the present disclosure.

FIG. 2 shows an example of generating a merge box by using virtual boxes, in an example of the present disclosure.

Operations of FIG. 2 may be performed by the vehicle control apparatus 100 of FIG. 1. For example, the operations of FIG. 2 may be performed by the processor 110 included in the vehicle control apparatus 100 of FIG. 1.

Referring to a first example 201 in FIG. 2, a processor included in a vehicle control apparatus according to an example may obtain a virtual box 211 of a first time point corresponding to a specified object of the first time point through a sensor (e.g., LiDAR). For example, the processor may obtain the virtual box 211 by using a plurality of points obtained at time point 't−1'.

Referring to a second example 203 in FIG. 2, in an example, the processor may convert the virtual box 211 of the first time point into a virtual box of a second time point after the first time point to generate a tracking box 213. For example, the second time point may be referred to as a current frame.

Referring to a third example 205 in FIG. 2, in an example, the processor may obtain a plurality of virtual boxes (e.g., virtual boxes 221, 223, 225, and 227) of the second time point, which are formed by a plurality of points obtained at the second time point, through the LiDAR.

The processor may identify virtual boxes associated with the tracking box 213 among the virtual boxes 221, 223, 225, and 227 of the second time point based on obtaining the virtual boxes 221, 223, 225, and 227 of the second time point formed by the plurality of points obtained at the second time point.

For example, the processor may determine whether the tracking box 213 is associated with the virtual boxes 221, 223, 225, and 227 of the second time point, based on at least one of a tracking point, an output point, a center point, a ratio at which the tracking box 213 overlaps a plurality of virtual boxes (e.g., virtual boxes 221, 223, 225, and 227) of the second time point, or any combination thereof.

For example, the processor may determine whether the tracking box 213 is associated with the plurality of virtual boxes (e.g., virtual boxes 221, 223, 225, and 227) of the second time point, based on a correlation or a threshold distance between the tracking box 213 and the plurality of virtual boxes (e.g., virtual boxes 221, 223, 225, and 227) of the second time point.

For example, the processor may determine whether the tracking box 213 is associated with the plurality of virtual boxes (e.g., virtual boxes 221, 223, 225, and 227) of the second time point, based on the correlation distance obtained based on Mahalanobis distance. For example, if the Mahalanobis distance is smaller than or equal to a reference distance (e.g., about 0.5 m), the processor may determine that the tracking box 213 is associated with the plurality of virtual boxes (e.g., virtual boxes 221, 223, 225, and 227) of the second time point.

For example, the processor may determine that the tracking box 213 is associated with the virtual boxes 221, 223, 225, and 227 of the second time point, based on the fact that the tracking box 213 overlaps the virtual boxes 221, 223, 225, and 227 of the second time point by a reference ratio (e.g., approximately 25%) or more.

Referring to a fourth example 207 in FIG. 2, in an example, the processor may generate a merge box 230 based on the associated virtual boxes 221, 223, 225, and 227.

For example, the processor may merge the virtual boxes 221, 223, 225, and 227 associated with the tracking box 213. For example, the processor may merge all or part of the virtual boxes 221, 223, 225, and 227 associated with the tracking box 213.

The processor may generate the merge box 230 based on merging all or part of the associated virtual boxes 221, 223, 225, and 227.

Hereinafter, examples of the vehicle control apparatus for generating the merge box 230 will be described later.

Figure 3:
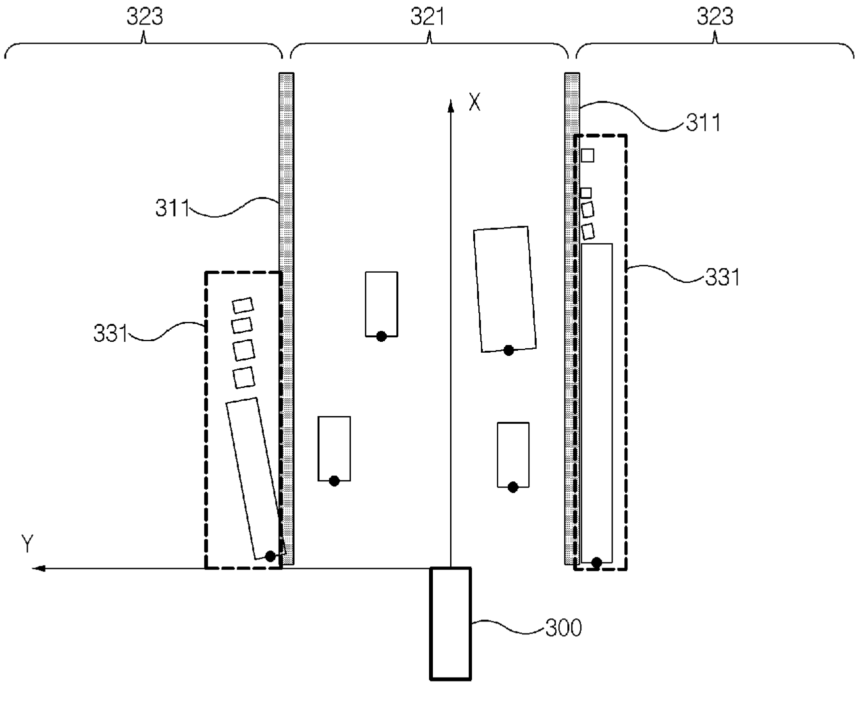
FIG. 3 shows an example of identifying virtual boxes outside a road edge, in an example of the present disclosure.

FIG. 3 shows an example of identifying virtual boxes outside a road edge, in an example of the present disclosure.

Operations of FIG. 3 may be performed by the vehicle control apparatus 100 of FIG. 1. For example, the operations of FIG. 3 may be performed by the processor 110 included in the vehicle control apparatus 100 of FIG. 1.

Referring to FIG. 3, a vehicle control apparatus according to an example may be included in a host vehicle 300. A processor included in the vehicle control apparatus according to an example may identify a road on which the host vehicle is driving. According to an example, the processor may identify the road on which the host vehicle is capable of driving. The processor may identify a first region 321 including a road and a road edge 311 (e.g., a border line, a guardrail).

The processor may identify a second region 323 different from the first region 321. For example, the second region 323 may be a region on which the host vehicle is incapable of driving, or may include a road opposite to a road on which the host vehicle is capable of driving. For example, assuming that the road on which the host vehicle is capable of driving is a lane bound for a particular destination (e.g., Seoul, New York, etc.) the road opposite to the road on which the host vehicle is capable of driving may be a lane bound away from the particular destination (e.g., Seoul, New York, etc.).

In an example, the processor may identify virtual boxes 331 outside the road edge 311. For example, while the host vehicle 300 is driving on a straight line and moving in a longitudinal direction, the processor may identify the virtual boxes 331 outside the road edge 311. For example, the longitudinal direction may include an x-axis direction (e.g., a driving direction of the host vehicle 300, the longitudinal direction) of a plane formed by an x-axis and a y-axis, among the x-axis, the y-axis, and a z-axis.

In an example, the processor may identify the associated virtual boxes 331 within the first specified distance (e.g., 50 m or 100 m) in a direction perpendicular to the front of the host vehicle 300. For example, a direction perpendicular to the front of the host vehicle 300 may include the y-axis direction.

The processor may not merge all or part of the virtual boxes 331 identified outside the road edge 311. For example, the processor may output each of the virtual boxes 331 identified outside the road edge 311 as a separate object based on not merging all or part of the virtual boxes 331 identified outside the road edge 311.

As described above, the processor included in the vehicle control apparatus according to an example may not merge all or part of the virtual boxes 331 identified outside the road edge 311. The processor may not merge all or part of the virtual boxes 331 identified outside the road edge 311, thereby reducing a computation time.

In an example, the processor 110 may receive an entry signal indicating that the host vehicle 300 enters an enclosed space (e.g., underground passage, for example, a tunnel).

For example, the processor 110 may identify a tunnel wall based on receiving a signal indicating that the host vehicle 300 is entering the tunnel. For example, the virtual boxes 331 identified outside the road edge 311 in FIG. 3 may include a tunnel wall.

The processor may not merge the virtual boxes 331 corresponding to the tunnel wall, thereby reducing a computation time.

Figure 4:
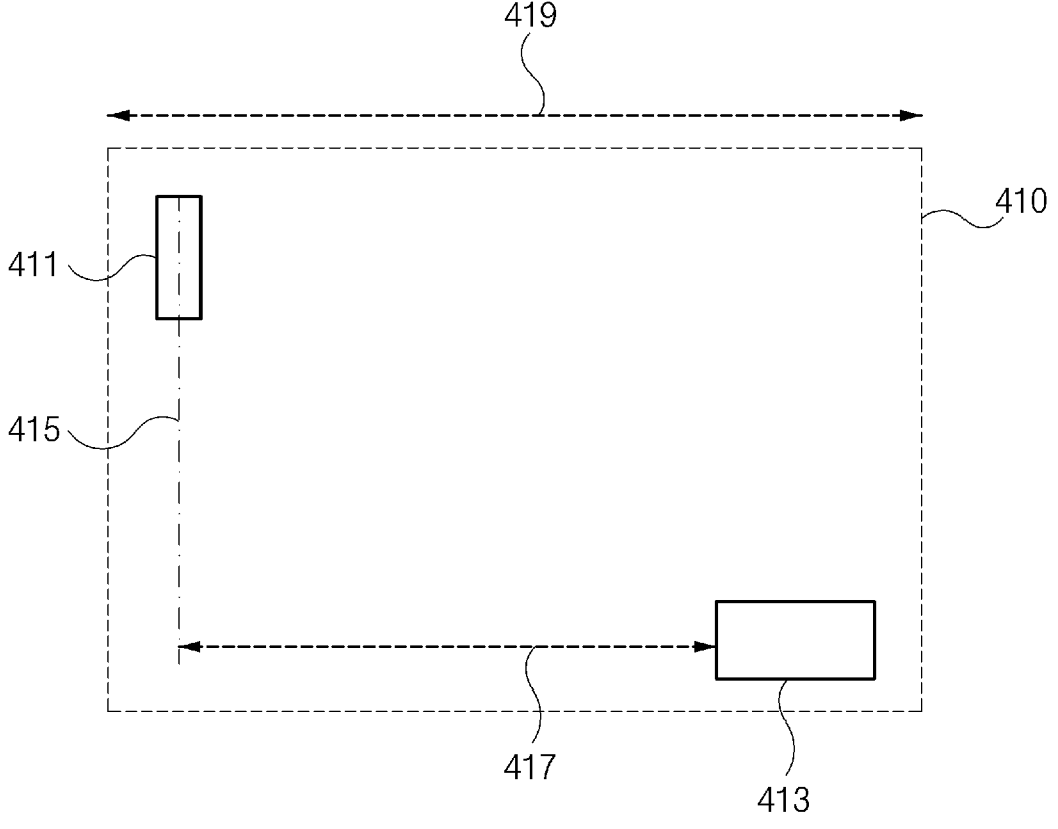
FIG. 4 shows an example of identifying a distance between virtual boxes, in an example of the present disclosure.

FIG. 4 shows an example of identifying a distance between virtual boxes, in an example of the present disclosure.

Operations of FIG. 4 may be performed by the vehicle control apparatus 100 of FIG. 1. For example, the operations of FIG. 4 may be performed by the processor 110 included in the vehicle control apparatus 100 of FIG. 1.

FIG. 4 shows an example of merging all or part of the virtual boxes associated with a tracking box based on a distance between the virtual boxes of a second time point.

Referring to FIG. 4, a processor included in a vehicle control apparatus according to an example may identify one or more virtual boxes (e.g., virtual boxes 411 and 413) associated with a tracking box 410 among virtual boxes of the second time point. For example, if a specified object corresponding to the tracking box 410 is in a stationary state, the processor may perform the following operations.

In an example, the processor 110 may determine whether the specified object is in a stationary state or a moving state, based on at least one of whether the specified object corresponding to the tracking box 410 is occluded (e.g., blocked, hidden, or obscured from view), a type of the specified object, a number of virtual boxes of the second time point, or any combination thereof.

The processor may identify the stationary state or moving state of the specified object based on the fact that the specified object is unobstructed or not occluded, and the type of the specified object is identified as a first specified type including a pedestrian, or the type of the specified object is identified as a third type different from a second specified type including a specialty vehicle (e.g., emergency vehicle, fire engine, ambulance, police car, etc.), and a number of virtual boxes of the second time point is smaller than the specified number.

The processor may identify that the specified object is in a stationary state, and may identify that at least one of a width 419 of the tracking box 410, a length of the tracking box 410, or any combination thereof is greater than or equal to a first reference length (e.g., about 30 m).

For example, if the specified object corresponding to the tracking box 410 is in a stationary state, and the width 419 of the tracking box 410 is greater than or equal to the first reference length (e.g., 30 m), and if a distance between associated virtual boxes is greater than or equal to a second reference length (e.g., 20 m), the processor may not merge the associated virtual boxes.

For example, the processor may identify a first straight line 415, which is perpendicular to a line segment forming the first virtual box 411 from the center point of the first virtual box 411, based on the fact that the first virtual box 411 is associated with the second virtual box 413.

The processor may identify a distance 417 between the first straight line 415 and the center point of the second virtual box 413. The processor may not merge or skip merging the first virtual box 411 and the second virtual box 413 based on identifying or determining that the distance between the first straight line 415 and the center point of the second virtual box 413 is greater than or equal to a reference distance (e.g., about 20 m).

The operation in which the processor does not merge or skips merging the first virtual box 411 and the second virtual box 413 may include an operation in which the processor excludes at least one of the first virtual box 411, the second virtual box 413, or any combination thereof from merge candidates.

Figure 5:
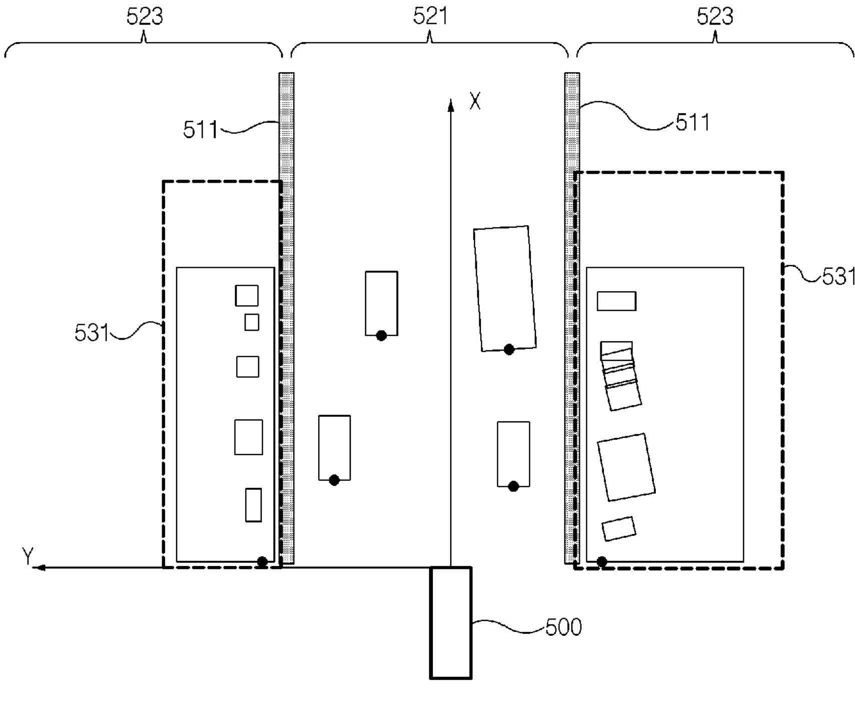
FIG. 5 shows an example of identifying virtual boxes outside a road edge, in an example of the present disclosure.

FIG. 5 shows an example of identifying virtual boxes outside a road edge (e.g., a border line, a guard rail, a fence, or a road wall, etc.), in an example of the present disclosure.

Operations of FIG. 5 may be performed by the vehicle control apparatus 100 of FIG. 1. For example, the operations of FIG. 5 may be performed by the processor 110 included in the vehicle control apparatus 100 of FIG. 1.

Referring to FIG. 5, a vehicle control apparatus according to an example may be included in a host vehicle 500. The processor included in the vehicle control apparatus may identify a road, on which the host vehicle 500 is driving, and a road edge 511 (e.g., a border line, a guard rail, a fence, or a road wall, etc.).

The processor may identify a first region 521 including a road and a road edge 511. The processor may identify a second region 523 different from the first region 521. For example, a second region 523 may include a region (e.g., unpaved road, sidewalks, bike lanes, beaches, mountain trails, off-road trails, restricted areas, construction sites, water bodies, stairs, elevated walkways, bridges, pedestrian malls, parks, etc.) outside the road edge 511. For example, the second region 523 may include a region in which the host vehicle 500 is incapable of driving.

In an example, the processor may identify virtual boxes 531 outside the road edge 511. For example, the processor may identify the virtual boxes 531 in the second region 523.

If the specified object corresponding to the tracking box is in a stationary state, the size of the tracking box is greater than or equal to a reference size (e.g., approximately 20 $m^2$), and the number of points included in the tracking box is greater than or equal to the reference number (e.g., approximately 1,000), the processor may perform the following operations.

In an example, the processor may identify the type of virtual boxes 531 identified outside the road edge 511. For example, the processor may identify the type of the virtual boxes 531 based on the density of points included in the virtual boxes 531 identified outside the road edge 511.

For example, the processor may determine whether the density of points included in the virtual boxes 531 is greater than or equal to the reference density. The processor may identify that the type of the virtual boxes 531 is the third specified type, based on the fact that the density of the points included in the virtual boxes 531 is greater than or equal to the reference density. For example, the processor may identify that the type of the virtual boxes 531 is the third specified type including a bush object, based on the fact that the density of the points included in the virtual boxes 531 is greater than or equal to the reference density. For example, the bush object may include an object with an irregular shape (e.g., a bush, woody stems, branches covered in leaves or needles, etc.).

In an example, the processor may not merge the virtual boxes 531 identified as being of the third specified type. For example, the processor may output each of the virtual boxes 531 based on not merging or selectively skip merging the virtual boxes 531 identified as being of the third specified type.

Figure 6:
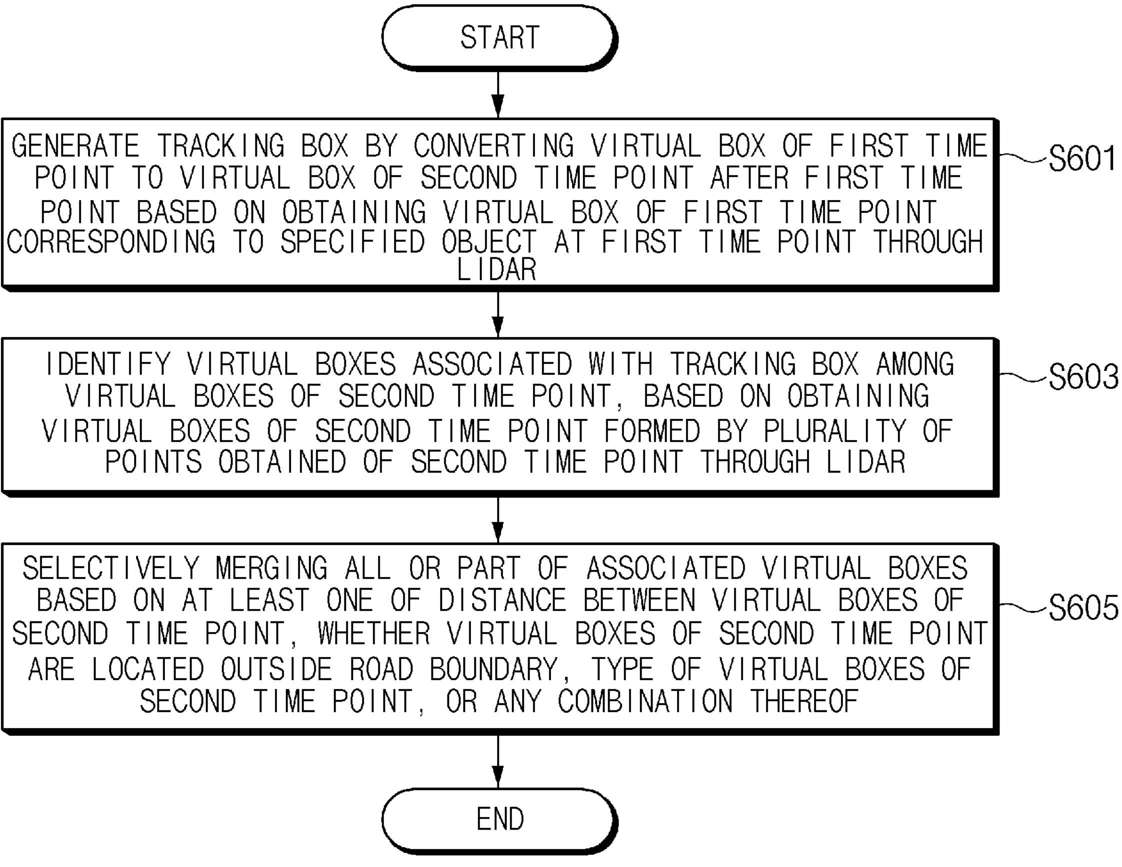
FIG. 6 shows an example of a flowchart of a vehicle control method, according to another example of the present disclosure.

FIG. 6 shows an example of a flowchart of a vehicle control method, according to another example of the present disclosure.

Hereinafter, a vehicle controlling method according to another example of the present disclosure will be described in detail with reference to FIG. 6. FIG. 6 is a flowchart for describing a vehicle controlling method, according to another example of the present disclosure.

Hereinafter, it is assumed that the vehicle controlling apparatus 100 of FIG. 1 performs the process of FIG. 6. In addition or in alternative, in a description of FIG. 6, it may be understood that an operation described as being performed by an apparatus is controlled by the processor 110 of the vehicle control apparatus 100.

At least one of operations of FIG. 6 may be performed by the vehicle control apparatus 100 of FIG. 1. Each of the operations in FIG. 6 may be performed sequentially, but is not necessarily sequentially performed. For example, the order of operations may be changed, and at least two operations may be performed in parallel.

Referring to FIG. 6, in operation S601, the vehicle control method according to an example may include an operation of generating a tracking box by converting a virtual box of a first time point to a virtual box of a second time point after the first time point based on obtaining the virtual box of the first time point corresponding to a specified object at the first time point through the LiDAR.

In operation S603, the vehicle control method according to an example may include an operation of identifying the virtual boxes associated with the tracking box among virtual boxes of the second time point, based on obtaining the virtual boxes of the second time point formed by a plurality of points obtained at the second time point through a sensor (e.g., LiDAR).

For example, the vehicle control method may include an operation of identifying virtual boxes associated with the tracking box among the virtual boxes of the second time point based on a fact that the tracking box overlaps each of the virtual boxes of the second time point by a specified ratio or more, or a distance between a plurality of first points included in the tracking box and a plurality of second points included in the virtual boxes of the second time point is identified as being within a correlation distance.

In operation S605, a vehicle control method according to an example may include an operation of selectively merging all or part of the associated virtual boxes based on at least one of a distance between virtual boxes of the second time point, whether the virtual boxes of the second time point are located outside a road edge, a type of the virtual boxes of the second time point, or any combination thereof.

For example, the vehicle control method may include an operation of generating a merge box based on merging all or part of the virtual boxes associated with the tracking box. The vehicle control method may include an operation to output the generated merge box.

For example, the vehicle control method may include an operation of not merging or selectively skip merging all or part of the virtual boxes associated with the tracking box. The vehicle control method may output each of the virtual boxes based on merging all or part of the virtual boxes associated with the tracking box.

Figure 7:
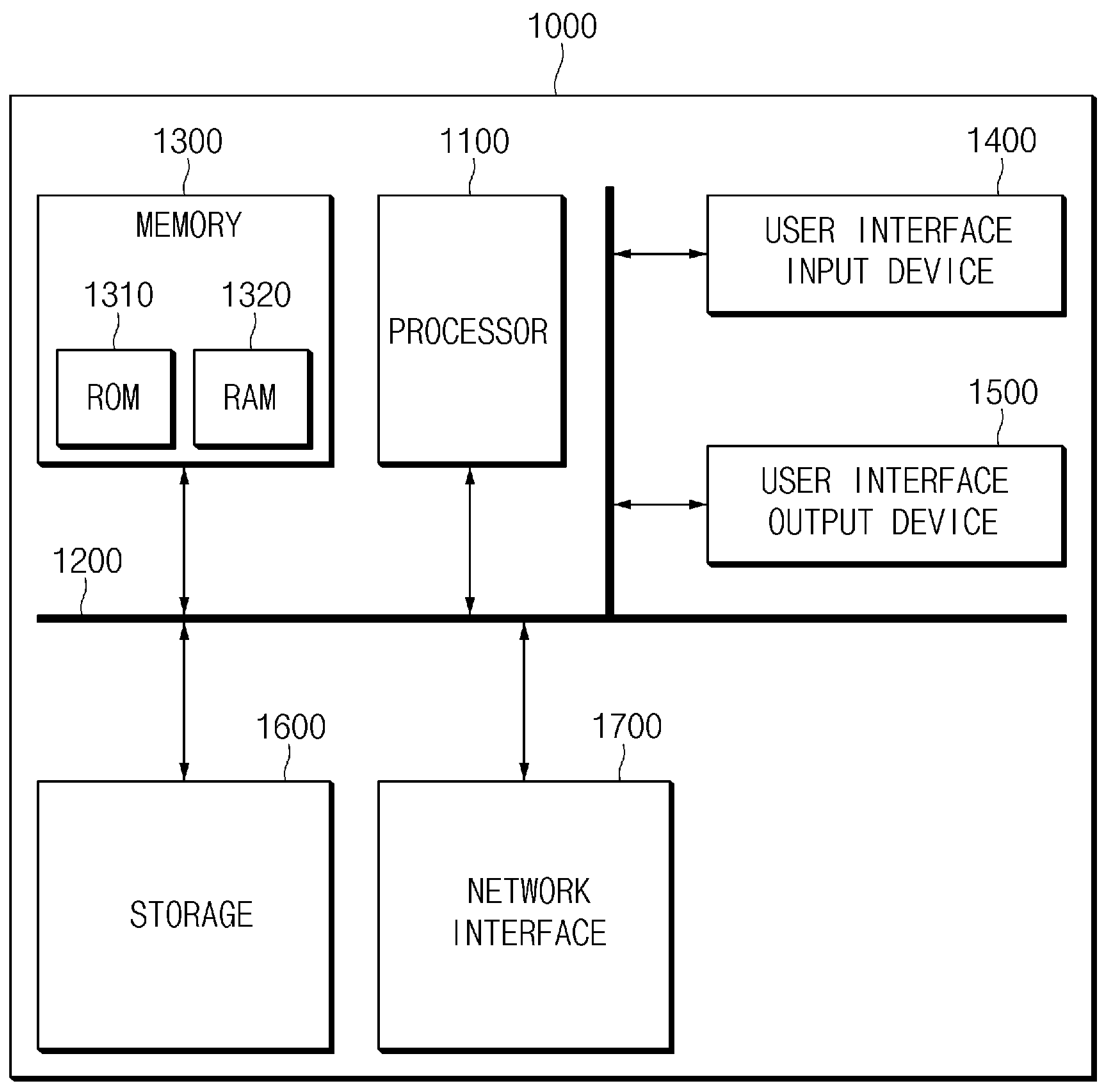
FIG. 7 shows an example of a computing system associated with a vehicle control apparatus, according to an example of the present disclosure.

FIG. 7 shows an example of a computing system associated with a vehicle control apparatus, according to an example of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively or additionally, the storage medium may be integrated with the processor 1100. The processor and storage medium may be implemented with an application specific integrated circuit (ASIC). The ASIC may be provided in a user terminal. Alternatively or additionally, the processor and storage medium may be implemented with separate components in the user terminal.

The present disclosure has been made to solve the above-mentioned problems occurring in the prior art while advantages achieved by the prior art are maintained intact.

An example of the present disclosure provides a vehicle control apparatus that merges virtual boxes generated by using a LiDAR or unmerges the merge box, and a method thereof.

An example of the present disclosure provides a vehicle control apparatus that reduces a load of a processor by determining whether to merge virtual boxes before merging the virtual boxes, and a method thereof.

An example of the present disclosure provides a vehicle control apparatus that reduces the load of the processor and shortens a computation time by not merging virtual boxes identified outside a road edge, and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include a light detection and ranging (LiDAR) and a processor. The processor may generate a tracking box by converting a virtual box of a first time point to a virtual box of a second time point after the first time point based on obtaining the virtual box of the first time point corresponding to a specified object at the first time point through the LiDAR, may identify virtual boxes associated with the tracking box among virtual boxes of the second time point, based on obtaining the virtual boxes of the second time point formed by a plurality of points obtained at the second time point through the LiDAR, and may selectively merge all or part of the associated virtual boxes based on at least one of a distance between the virtual boxes of the second time point, whether the virtual boxes of the second time point are located outside a road edge, a type of the virtual boxes of the second time point, or a combination of the distance between the virtual boxes of the second time point, whether the virtual boxes of the second time point are located outside the road edge, and the type of the virtual boxes of the second time point.

In an example, the processor may identify the virtual boxes associated with the tracking box among the virtual boxes of the second time point based on a fact that the tracking box overlaps each of the virtual boxes of the second time point by a specified ratio or more, or a distance between a plurality of first points included in the tracking box and a plurality of second points included in the virtual boxes of the second time point is identified as being within a correlation distance.

In an example, the processor may identify that the specified object is not occluded, and may identify a stationary state or a moving state of the specified object, based on a type of the specified object is identified as a first specified type including a pedestrian, or the type of the specified object is identified as a type different from a second specified type including a specialty vehicle, and the number of the virtual boxes of the second time point is smaller than a specified number.

In an example, the processor may identify that the specified object is in the stationary state, may identify that at least one of a width or a length of the tracking box is greater than or equal to a first reference length, may identify a first straight line perpendicular to a line segment forming a first virtual box from a first center point of the first virtual box among the virtual boxes of the second time point, based on a fact that the specified object is in the stationary state and at least one of the width or the length of the tracking box is greater than or equal to the first reference length, and may not merge the associated virtual boxes based on a fact that a distance between the first straight line and a second center point of a second virtual box among the virtual boxes of the second time point is greater than or equal to a second reference length.

In an example, the processor may identify that a road, on which the host vehicle including the vehicle control apparatus is driving, is a straight line road, may identify that the specified object is a stationary state among the stationary state and a moving state, and may identify all or part of the associated virtual boxes within a first specified distance in a direction perpendicular to a front of the host vehicle.

In an example, the processor may identify a first region including the road and the road edge, may identify a second region different from the first region including the road and the road edge, and may not merge all or part of the associated virtual boxes, which are identified in the second region, from among all or part of the associated virtual boxes identified within the first specified distance.

In an example, the processor may receive an entry signal indicating that a host vehicle including the vehicle control apparatus enters a tunnel, may identify that the specified object is a stationary state among the stationary state and a moving state, may identify that the associated virtual boxes are located within a second specified distance, in a direction perpendicular to the specified object, may identify that a length of each of the associated virtual boxes is greater than or equal to a reference length, and may not merge all or part of the associated virtual boxes based on identifying that the number of points included in the associated virtual boxes is greater than or equal to a first reference number.

In an example, the processor may identify that the specified object is a stationary state among the stationary state and a moving state, may identify that a size of the tracking box is greater than or equal to a reference size, may identify that the number of points included in the tracking box is greater than or equal to a second reference number, and may not merge all or part of the associated virtual boxes based on a type of the associated virtual boxes being identified as a third specified type.

In an example, the processor may identify the type of the associated virtual boxes based on density of points included in the associated virtual boxes.

In an example, the processor may identify that the type of the associated virtual boxes is the third specified type, based on the density of the points being greater than or equal to reference density.

According to an example of the present disclosure, a vehicle control method may include generating a tracking box by converting a virtual box of a first time point to a virtual box of a second time point after the first time point based on obtaining the virtual box of the first time point corresponding to a specified object at the first time point through the LiDAR, identifying virtual boxes associated with the tracking box among virtual boxes of the second time point, based on obtaining the virtual boxes of the second time point formed by a plurality of points obtained at the second time point through the LiDAR, and selectively merging all or part of the associated virtual boxes based on at least one of a distance between the virtual boxes of the second time point, whether the virtual boxes of the second time point are located outside a road edge, a type of the virtual boxes of the second time point, or a combination of the distance between the virtual boxes of the second time point, whether the virtual boxes of the second time point are located outside the road edge, and the type of the virtual boxes of the second time point.

According to an example, the vehicle control method may further include identifying the virtual boxes associated with the tracking box among the virtual boxes of the second time point based on a fact that the tracking box overlaps each of the virtual boxes of the second time point by a specified ratio or more, or a distance between a plurality of first points included in the tracking box and a plurality of second points included in the virtual boxes of the second time point is identified as being within a correlation distance.

According to an example, the vehicle control method may further include identifying that the specified object is not occluded, and identifying a stationary state or a moving state of the specified object, based on a type of the specified object is identified as a first specified type including a pedestrian, or the type of the specified object is identified as a type different from a second specified type including a specialty vehicle, and the number of the virtual boxes of the second time point is smaller than a specified number.

According to an example, the vehicle control method may further include identifying that the specified object is in the stationary state, identifying that at least one of a width or a length of the tracking box is greater than or equal to a first reference length, identifying a first straight line perpendicular to a line segment forming a first virtual box from a first center point of the first virtual box among the virtual boxes of the second time point, based on a fact that the specified object is in the stationary state and at least one of the width or the length of the tracking box is greater than or equal to the first reference length, and not merging the associated virtual boxes based on a fact that a distance between the first straight line and a second center point of a second virtual box among the virtual boxes of the second time point is greater than or equal to a second reference length.

According to an example, the vehicle control method may further include identifying that a road, on which the host vehicle including the vehicle control apparatus is driving, is a straight line road, identifying that the specified object is a stationary state among the stationary state and a moving state, and identifying all or part of the associated virtual boxes within a first specified distance in a direction perpendicular to a front of the host vehicle.

According to an example, the vehicle control method may further include identifying a first region including the road and the road edge, identifying a second region different from the first region including the road and the road edge, and not merging all or part of the associated virtual boxes, which are identified in the second region, from among all or part of the associated virtual boxes identified within the first specified distance.

According to an example, the vehicle control method may further include receiving an entry signal indicating that a host vehicle including the vehicle control apparatus enters a tunnel, identifying that the specified object is a stationary state among the stationary state and a moving state, identifying that the associated virtual boxes are located within a second specified distance, in a direction perpendicular to the specified object, identifying that a length of each of the associated virtual boxes is greater than or equal to a reference length, and not merging all or part of the associated virtual boxes based on identifying that the number of points included in the associated virtual boxes is greater than or equal to a first reference number.

According to an example, the vehicle control method may further include identifying that the specified object is a stationary state among the stationary state and a moving state, identifying that a size of the tracking box is greater than or equal to a reference size, identifying that the number of points included in the tracking box is greater than or equal to a second reference number, and not merging all or part of the associated virtual boxes based on a type of the associated virtual boxes being identified as a third specified type.

According to an example, the vehicle control method may further include identifying the type of the associated virtual boxes based on density of points included in the associated virtual boxes.

According to an example, the vehicle control method may further include identifying that the type of the associated virtual boxes is the third specified type, based on the density of the points being greater than or equal to reference density.

The above description is merely an example of the technical idea of the present disclosure, and various modifications and modifications may be made by one skilled in the art without departing from the essential characteristic of the present disclosure.

Accordingly, examples of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

According to an example of the present disclosure, a vehicle control apparatus may merge virtual boxes generated by using a LiDAR or may unmerges the merge box.

Moreover, according to an example of the present disclosure, the vehicle control apparatus may reduce a load of a processor by determining whether to merge virtual boxes before merging the virtual boxes.

Moreover, according to an example of the present disclosure, the vehicle control apparatus may reduce the load of the processor and may shorten a computation time by not merging virtual boxes identified outside a road edge Besides, a variety of effects directly or indirectly understood through the specification may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a vehicle, the apparatus comprising:
- a sensor; and
- a processor,
- wherein the processor is configured to:
  - generate, based on obtaining a virtual box corresponding to an object at a first time point through the sensor, a tracking box by converting the virtual box to a virtual box at a second time point after the first time point;
  - determine virtual boxes associated with the tracking box among a plurality of virtual boxes at the second time point, based on obtaining the plurality of virtual boxes at the second time point formed by a plurality of points obtained at the second time point through the sensor;
  - determine that the object is unobstructed;
  - determine a stationary state or a moving state of the object, based on:
    - a type of the object being determined as:
      - a first type including a pedestrian, or
      - a third type different from a second type including a specialty vehicle, and
    - a number of the plurality of virtual boxes at the second time point being smaller than a specified number;
  - selectively merge all or part of the determined virtual boxes based on at least one of:
    - a distance between the plurality of virtual boxes at the second time point,
    - whether the plurality of virtual boxes at the second time point are located outside a road edge, or
    - a type of the plurality of virtual boxes at the second time point; and
  - output a signal indicating the selectively merged virtual boxes.

2. The apparatus of claim 1, wherein the processor is configured to:
- determine the virtual boxes associated with the tracking box among the plurality of virtual boxes at the second time point further based on:
  - the tracking box overlapping each of the plurality of virtual boxes at the second time point by a specified ratio or more, or
  - a distance between a plurality of first points included in the tracking box and a plurality of second points included in the plurality of virtual boxes at the second time point being within a correlation distance.

3. The apparatus of claim 1, wherein the processor is configured to:
- determine that the object is in the stationary state;
- determine that at least one of a width or a length of the tracking box is greater than or equal to a first reference length;
- determine a first straight line perpendicular to a line segment forming a first virtual box from a first center point of the first virtual box among the plurality of virtual boxes at the second time point, based on the object being in the stationary state and at least one of the width or the length of the tracking box being greater than or equal to the first reference length; and
- selectively skip merging at least a portion of the determined virtual boxes based on a distance between the first straight line and a second center point of a second virtual box among the plurality of virtual boxes at the second time point being greater than or equal to a second reference length.

4. The apparatus of claim 1, wherein the processor is configured to:
- determine that a road, on which the vehicle including the apparatus is driving, is a straight line road;
- determine that the object is in the stationary state; and
- determine all or part of the determined virtual boxes within a first specified distance in a direction perpendicular to a front of the vehicle.

5. The apparatus of claim 4, wherein the processor is configured to:
- determine a first region including the road and the road edge;

determine a second region different from the first region including the road and the road edge; and selectively skip merging all or part of the determined virtual boxes, which are detected in the second region, from among all or part of the determined virtual boxes detected within the first specified distance.

6. The apparatus of claim 1, wherein the processor is configured to:

receive an entry signal indicating that a vehicle including the apparatus enters an enclosed space;

determine that the object is in the stationary state determine that the determined virtual boxes are located within a second specified distance, in a direction perpendicular to the object;

determine that a length of each of the determined virtual boxes is greater than or equal to a reference length; and selectively skip merging all or part of the determined virtual boxes based on determining that a number of points included in the determined virtual boxes is greater than or equal to a first reference number.

7. The apparatus of claim 1, wherein the processor is configured to:

determine that the object is in the stationary state determine that a size of the tracking box is greater than or equal to a reference size;

determine that a number of points included in the tracking box is greater than or equal to a second reference number; and selectively skip merging all or part of the determined virtual boxes based on a type of the determined virtual boxes being determined as a third type that is different from a first type associated with a pedestrian and different from a second type associated with a vehicle.

8. The apparatus of claim 7, wherein the processor is configured to:

determine the type of the determined virtual boxes based on density of points included in the determined virtual boxes.

9. The apparatus of claim 8, wherein the processor is configured to:

determine that the type of the determined virtual boxes is the third type, based on the density of the points being greater than or equal to reference density.

10. A method for controlling a vehicle, the method comprising:

generating, by an apparatus and based on obtaining a virtual box corresponding to an object at a first time point through a sensor, a tracking box by converting the virtual box to a virtual box at a second time point after the first time point;

determining virtual boxes associated with the tracking box among a plurality of virtual boxes at the second time point, based on obtaining the plurality of virtual boxes at the second time point formed by a plurality of points obtained at the second time point through the sensor;

determining that the object is unobstructed;

determining a stationary state or a moving state of the object, based on:

a type of the object being determined as:

a first type including a pedestrian, or a third type different from a second type including a specialty vehicle, and a number of the plurality of virtual boxes at the second time point being smaller than a specified number;

selectively merging all or part of the determined virtual boxes based on at least one of:

a distance between the plurality of virtual boxes at the second time point, whether the plurality of virtual boxes at the second time point are located outside a road edge, or a type of the plurality of virtual boxes at the second time point; and outputting a signal indicating the selectively merged virtual boxes.

11. The method of claim 10, wherein the determining the virtual boxes associated with the tracking box among the plurality of virtual boxes at the second time point is further based on:

the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance.

12. The method of claim 11, further comprising:

determining that the object is in the stationary state;

determining that at least one of a width or a length of the tracking box is greater than or equal to a first reference length;

determining a first straight line perpendicular to a line segment forming a first virtual box from a first center point of the first virtual box among the plurality of virtual boxes at the second time point, based on the object being in the stationary state and at least one of the width or the length of the tracking box being greater than or equal to the first reference length; and selectively skip merging at least a portion of the determined virtual boxes based on a distance between the first straight line and a second center point of a second virtual box among the plurality of virtual boxes at the second time point being greater than or equal to a second reference length.

13. The method of claim 10, further comprising:

determining that a road, on which the vehicle including the apparatus is driving, is a straight line road;

determining that the object is in the stationary state; and determining all or part of the determined virtual boxes within a first specified distance in a direction perpendicular to a front of the vehicle.

14. The method of claim 13, further comprising:

determining a first region including the road and the road edge;

determining a second region different from the first region including the road and the road edge; and selectively skip merging all or part of the determined virtual boxes, which are detected in the second region, from among all or part of the determined virtual boxes detected within the first specified distance.

15. The method of claim 10, further comprising:

receiving an entry signal indicating that a vehicle enters an enclosed space;

determining that the object is in the stationary state;

determining that the determined virtual boxes are located within a second specified distance, in a direction perpendicular to the object;

determining that a length of each of the determined virtual boxes is greater than or equal to a reference length; and selectively skip merging all or part of the determined virtual boxes based on determining that a number of points included in the determined virtual boxes is greater than or equal to a first reference number.

16. The method of claim 10, further comprising:
determining that the object is in the stationary state;
determining that a size of the tracking box is greater than or equal to a reference size;
determining that a number of points included in the tracking box is greater than or equal to a second reference number; and
selectively skip merging all or part of the determined virtual boxes based on a type of the determined virtual boxes being determined as a third type that is different from a first type associated with a pedestrian and different from a second type associated with a vehicle.

17. The method of claim 16, further comprising:
determining the type of the determined virtual boxes based on density of points included in the determined virtual boxes.

18. The method of claim 17, further comprising:
determining that the type of the determined virtual boxes is the third type, based on the density of the points being greater than or equal to reference density.

19. The method of claim 10, wherein the object that is unobstructed is identified at the first time point,
wherein the stationary state or the moving state is determined after the determining that the object is unobstructed, and
wherein the selectively merging all or part of the determined virtual boxes is further based on the determined stationary state or the determined moving state.

20. The apparatus of claim 1, wherein the object that is unobstructed is identified at the first time point,
wherein the stationary state or the moving state is determined after the determining that the object is unobstructed, and
wherein the processor is configured to selectively merge all or part of the determined virtual boxes further based on the determined stationary state or the determined moving state.

* * * * *